(12) United States Patent
Ishikawa et al.

(10) Patent No.: US 7,150,386 B2
(45) Date of Patent: Dec. 19, 2006

(54) SYSTEMS AND STRUCTURES FOR SUPPORTING VIBRATORS

(75) Inventors: Seiji Ishikawa, Nagoya (JP); Takayuki Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 221 days.

(21) Appl. No.: 10/346,661

(22) Filed: Jan. 17, 2003

(65) Prior Publication Data

US 2003/0141340 A1 Jul. 31, 2003

(30) Foreign Application Priority Data

Jan. 30, 2002 (JP) .......................... P2002-022070
Dec. 6, 2002 (JP) .......................... P2002-355782

(51) Int. Cl.
*H01L 41/053* (2006.01)
(52) U.S. Cl. ...................... 228/4.5; 310/352
(58) Field of Classification Search ............ 228/110.1, 228/106, 262, 4.5, 180.5, 1.1; 310/352
See application file for complete search history.

(56) References Cited

U.S. PATENT DOCUMENTS

| | | | | |
|---|---|---|---|---|
| 3,054,915 A | * | 9/1962 | Houck | 310/326 |
| 3,742,181 A | * | 6/1973 | Costello | 219/85.12 |
| 5,256,929 A | * | 10/1993 | Terajima | 310/326 |
| 6,134,962 A | * | 10/2000 | Sugitani | 73/504.16 |
| 6,269,999 B1 | * | 8/2001 | Okazaki et al. | 228/110.1 |
| 6,288,478 B1 | * | 9/2001 | Ishitoko et al. | 310/352 |

FOREIGN PATENT DOCUMENTS

| | | |
|---|---|---|
| EP | 0 881 465 A2 | 12/1998 |
| JP | 2001-012955 | 1/2001 |
| JP | 2001-012955 A | 1/2001 |
| JP | 2001-091259 | 4/2001 |
| JP | 2001-296128 | 10/2001 |
| JP | 2001-304870 | 10/2001 |

OTHER PUBLICATIONS

U.S. Appl. No. 10/842,250, filed May 10, 2004, Ishikawa et al.

* cited by examiner

*Primary Examiner*—Jonathan Johnson
(74) *Attorney, Agent, or Firm*—Burr & Brown

(57) ABSTRACT

An object of the present invention is to provide a novel system for supporting a vibrator having a terminal for electrical connection so that the vibrator may be miniaturized and the deviation of vibration property among vibrators mounted on the supporting systems may be prevented. The supporting system has a substrate 11 and bonding wires 9, 10 supported on the substrate 11 and to be joined with a vibrator 1. The vibrator 1 is supported with the bonding wires 9, 10 so that the vibrator 1 does not directly contact the substrate 11 and bonding wires 9, 10 are electrically connected with a terminal 6 of the vibrator 1.

16 Claims, 19 Drawing Sheets

SYSTEMS AND STRUCTURES FOR SUPPORTING VIBRATORS

This application claims the benefits of Japanese Patent Applications P2002-22070 filed on Jan. 30, 2002, and P2002-355782 filed on Dec. 6, 2002, the entireties of which are incorporated by reference.

BACKGROUND OF THE INVENTION

1. Field of the Invention

The present invention provides a system and structure for supporting a vibrator.

2. Related Art Statement

It has been studied to use a vibratory gyroscope as a turning angular rate sensor employed in a vehicle control system of an automobile body based on a vehicle turning rate feedback system. Such a system detects the direction of a steering wheel itself by a turning angle of the steering wheel. Simultaneously, the turning rate of the car vehicle is detected by the vibratory gyroscope. The system finds a difference by comparing the direction of the steering wheel with the actual body turning velocity, and attains a stable vehicle control by correcting a wheel torque and a steering angle on the basis of this difference.

In a vehicle control system, a vibratory gyroscope and its vibrator is subjected to a wide temperature range including high and low temperatures. Such temperature range normally includes minus 40° C. to plus 85° C. and may be more wider in a more severe specification. Particularly when a vibrator is made of a piezoelectric single crystal, the temperature dependency of the single crystal may affect the stability of the gyroscope. The assignee filed a Japanese patent publication 2001-12955A. In the publication, a vibrator is adhered to a supporting member with an adhesive having a tan δ of not higher than 0.1 within the temperature range, for preventing the deviation of Q value of a detection vibration with temperature change.

SUMMARY OF THE INVENTION

The inventors have studied a manufacturing process of manufacturing a structure for adhering and fixing a vibrator made of a piezoelectric single crystal onto a supporting member, and found the following problems. That is, a vibrator is typically adhered onto a pin or plate-shaped supporting member to produce a supporting structure of a vibrator. It is necessary to supply and flow a liquid adhesive composition between the vibrator and supporting member and then solidify the adhesive. An adhesive such as silver paste is then flown into a clearance between the supporting member and a substrate of a package and subjected to a heat treatment so that the adhesive is solidified. It is thus possible to join the vibrator and supporting member with an adhesive onto the substrate of a package. Such adhesive for adhering the vibrator to the supporting member may preferably be a silicone resin adhesive.

The inventors, however, have encountered the following problems as a result of technological developments. That is, the inventors have conducted studies to miniaturize a vibrator and its supporting structure to reduce the thickness of a package. For example, for containing a vibratory gyroscope in a digital camera system of a mobile telephone, a miniaturized package is demanded.

When the supporting member for a vibrator is made of a thin plate having a thickness of not larger than 0.5 mm, and further not larger than 0.3 mm, the following problems are induced. For example, an area for adhesion is reduced and a volume of used adhesive is substantially reduced in the miniaturized vibratory gyroscope. In this case, when liquid adhesive composition is flown into a clearance between the vibrator and plate-shaped supporting member and solidified, it becomes difficult to uniformly adjust the volume and surface area of the adhesive. Further, it becomes difficult to control the shape and volume of the adhesive layer, because suspension or unnecessary adhesion of the liquid adhesive composition may easily occur. If the shape or volume of the adhesive layer is uneven or suspension or unnecessary adhesion occurs, the whole of the physical properties of the adhesive layer is changed. As a result, the vibration property of the vibrator may be substantially changed. Particularly when the vibrator is used for a vibratory gyroscope, the vibrator has a signal electrode outputting an output signal, which is then directly used for calculating a turning angular rate. Therefore, if the vibration property of the vibrator is changed, noise signal in the output may be increased. It may be thus difficult to subtract the contribution of the noise and to obtain a correct value of a turning angular rate.

An object of the present invention is to provide a novel system for supporting a vibrator having a terminal for electrical connection so that the vibrator may be miniaturized.

Another object of the present invention is to prevent the deviation of the vibration property among vibrators in the supporting systems.

The present invention provides a system for supporting a vibrator having a terminal for electrical connection. The system has a substrate and a bonding wire supported on the substrate and to be connected with the vibrator. The vibrator is supported with the bonding wire so that the vibrator is not contacted with the substrate and bonding wire is electrically connected with the terminal.

The present invention further provides a supporting structure comprising the system and the vibrator supported with the system.

The inventors have noted a bonding wire for supplying an electrical signal into a terminal of a vibrator or sending a specific electrical signal from the terminal of a vibrator to a packaging substrate. They have thus reached the following idea. That is, a bonding wire is fixed on a substrate and joined with a vibrator so that the vibrator is supported over the surface of the substrate without direct contact with the substrate. A structural strength for supporting a vibrator above the substrate may be assured by means of the bonding wire by miniaturizing the vibrator. It is thus possible to reduce the deviation or change of the vibration among vibrators according to the supporting structure.

These and other objects, features and advantages of the invention will be appreciated upon reading the following description of the invention when taken in conjunction with the attached drawings, with the understanding that some modifications, variations and changes of the same could be made by the skilled person in the art.

DETAILED DESCRIPTION OF THE INVENTION

Figure 1:
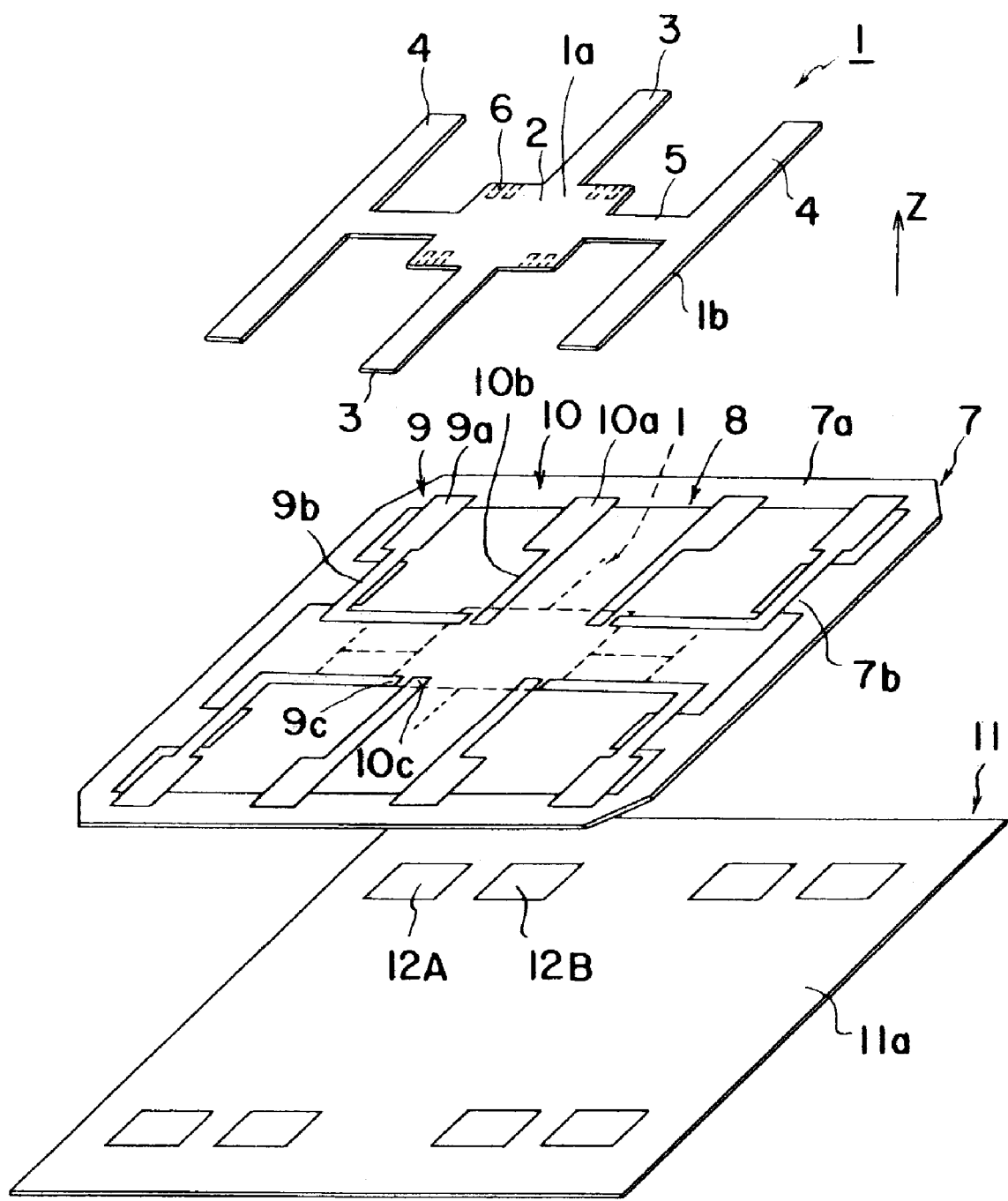
FIG. 1 is a broken perspective view showing a supporting structure according to the present invention.
Figure 2:
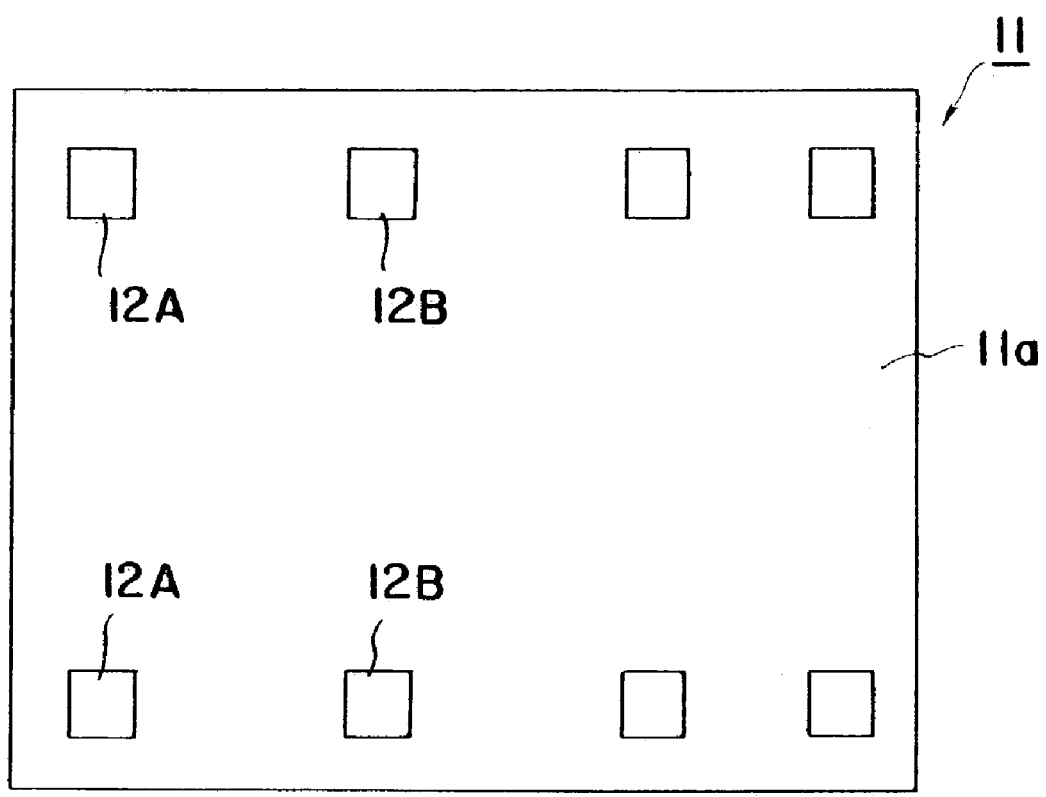
FIG. 2 is a plan view showing a substrate 11 for use in the embodiment shown in FIG. 1.
Figure 3:
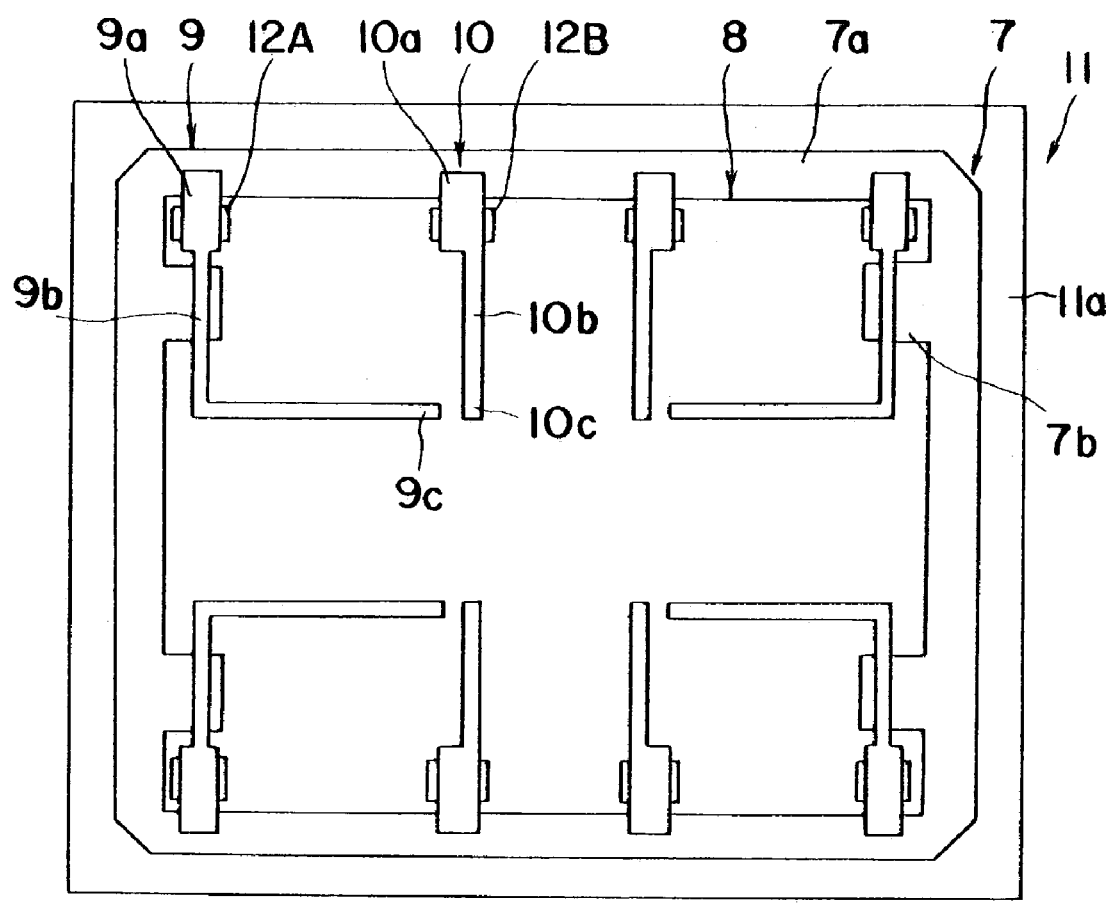
FIG. 3 is a plan view showing a frame 7 and bonding wires 9 and 10 fixed on the substrate 11.

The present invention will be described in detail referring to the attached drawings. FIG. 1 is a broken perspective view showing a supporting structure according to the present invention, and FIG. 2 is a plan view showing a substrate 11 for use in the present embodiment. FIG. 3 is a plan view showing a flame 7 and bonding wires 9, 10 fixed on the substrate 11. and FIG. 4 is a plan view showing a supporting structure according to the present embodiment.

As shown in FIG. 2, a substrate 11 in the present example has a mounting face 11a on which contactpads 12A and 12B are provided. As shown in FIG. 3, a frame 7 made of en insulating material is provided on the mounting face 11a. The frame 7 has an outer frame 7a and supplemental supporting parts 7b protruding from the outer frame to an inner hollow portion 8 formed inside of the frame 7. A part of the mounting face 11a of the substrate 11 is exposed from the hollow portion 8. The end parts 9a and 10a of bonding wires 9 and 10 are joined and fixed to the outer frame 7a. The end parts 9a and 10a are electrically connected with the corresponding pads 12A and 122B, respectively. The bonding wires 9 and 10 further have elongate main bodies 9b and 10b extending from the end parts 9a and 10a, respectively. The main body 9b is supported on the supporting part 7b.

Figure 4:
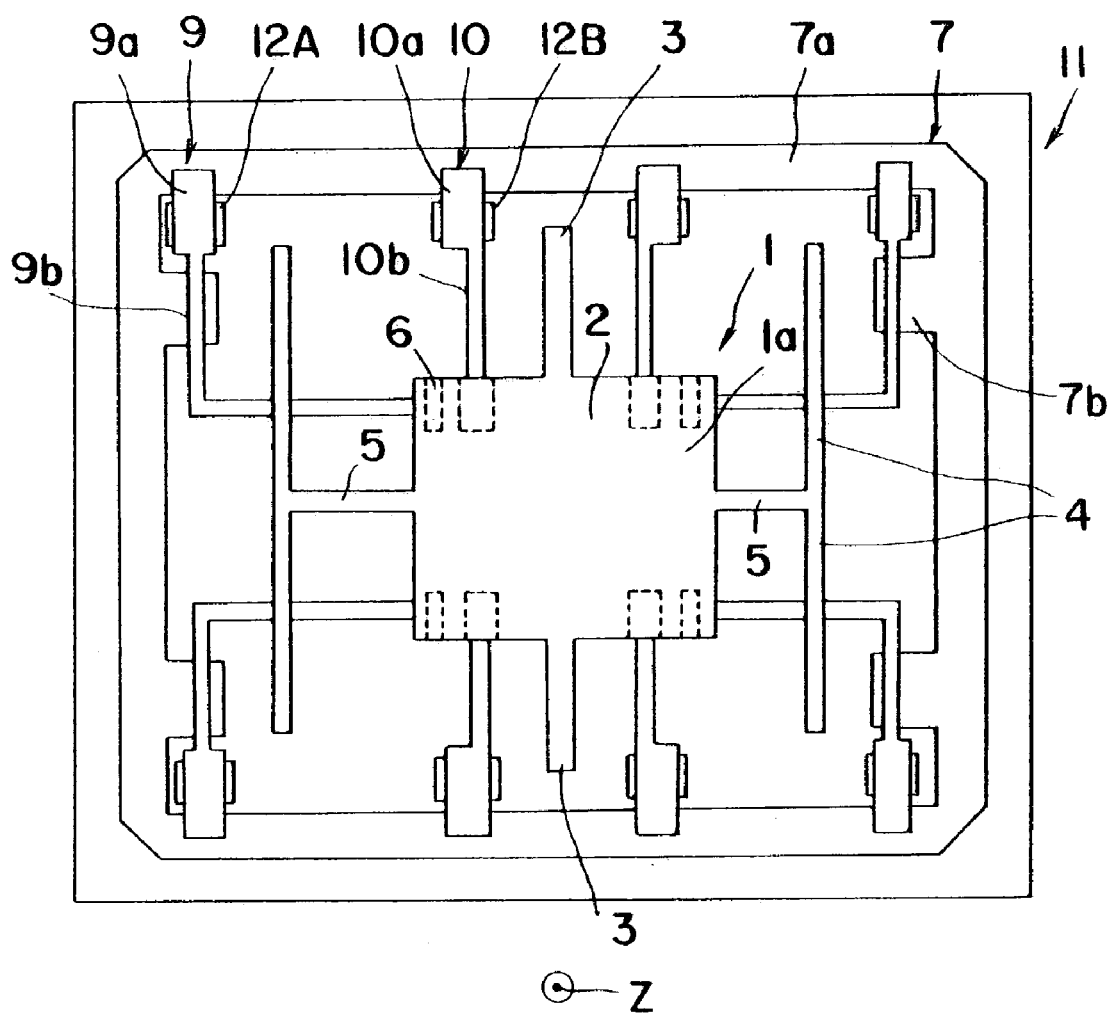
FIG. 4 is a plan view showing a supporting structure according to the embodiment shown in FIG. 1.

A vibrator 1 is then mounted as shown in FIG. 4. As shown in FIGS. 1 and 4, the vibrator 1 according to the present example has a fixing portion 2, and a pair of detection vibration pieces 3 protruding from the fixing portion 2. The vibrator further has a pair of supporting portions 5 protruding from the fixing portion 2 and driving vibration pieces 4 provided on the ends of the supporting portions 5. When driving vibration is excited in the vibrator, each driving vibration piece 4 vibrates around the base of the piece 4 to the supporting portion 5 as its fulcrum. The vibrator 1 is rotated around a rotating axis (Z-axis) extending in a direction perpendicular to the vibrator 1. The supporting portion 5 then vibrates in bending vibration mode around the base of the supporting portion 5 to the fixing portion 2 as its fulcrum. Responsive to the vibration, each detection vibration piece 3 vibrates in bending vibration mode around the base of the piece 3 to the fixing portion 2. Each detection vibration piece 3 generates electrical signal corresponding to the detection vibration. The electrical signal is then utilized to calculate a turning angular rate around the rotating axis (Z axis).

A terminal 6 is provided on the fixing part 2. The terminal 6 is electrically connected with electrodes on the driving and detection vibration pieces through wirings not shown.

Figure 9:
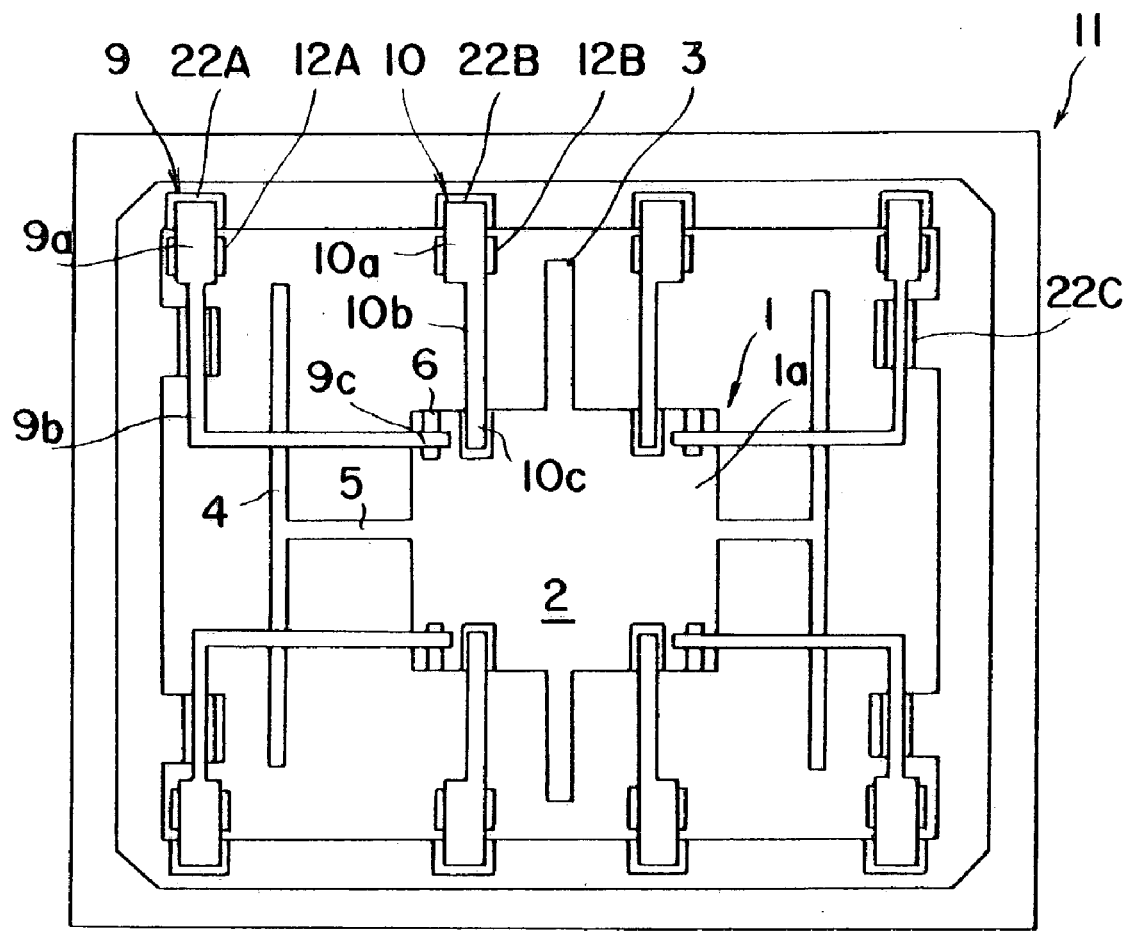
FIG. 9 is a plan view showing a supporting structure according to the embodiment shown in FIG. 6.

The end parts 9c and 10c of the bonding wires 9, 10 are joined with the terminals 6 on the vibrator. In the present example, each bonding wire is joined with the terminal 6 on a lower face 1b of the vibrator 1 so that the vibrator is fixed on the bonding wires. It is required that the vibrator 1 does not directly contact the mounting face 11a of the substrate 11. Alternatively as shown in FIG. 9, the end parts 9c or 10c of each bonding wire may be joined with the terminal 6 on an upper face of the vibrator.

As a result, the vibrator 1 is supported and mounted by means of the bonding wires 9 and 10 through the frame 7 over the substrate 11. The terminals of the vibrator 1 are electrically connected with the respective contact pads on the substrate 11 through the bonding wires 9 and 10, respectively. Further, the vibrator 1 is supported on the mounting face 11a of the substrate so that the vibrator does not directly contact the mounting face 11a to prevent the adverse effects of the substrate on the vibration of the vibrator 1.

The end parts of the bonding wires 9 and 10 may be bent to support the end parts 9c and 10c of the vibrator 1 beyond the mounting face 11a of the substrate 11. It is thus possible to adjust the distance between the vibrator 1 and mounting face 11a and to prevent the contact of the vibrator 1 to the mounting face 11a.

The material of the vibrator is not particularly limited, and may preferably be a piezoelectric single crystal. The material may more preferably be a piezoelectric single crystal selected from the group consisting of quartz, lithium niobate, lithium tantalite, lithium niobate-lithium tantalite solid solution, lithium borate and langasite.

The dimensions of the vibrator are not particularly limited. However, if the weight or dimensions of the vibrator is too large, too much weight may be applied on the bonding wire to possibly deform the bonding wire over a long period of time. The width of the vibrator may preferably be not larger than 10 mm and more preferably be not larger than 5 mm for preventing adverse effects of the deformation of the bonding wire on the vibration. On this viewpoint, the weight of the vibrator may preferably be not larger than 5 mg and more preferably be not larger than 1 mg. Further, the thickness of the vibrator may preferably be not larger than 0.3 mm and more preferably be not larger than 0.2 mm.

The material for the substrate 11 is not particularly limited and may be an insulating material, used for a package, such a ceramics, glass or resin.

Although the bonding wire may be directly supported on the mounting face of the substrate, the bonding wire may preferably be supported on the frame on the substrate. The reasons are as follows. It is necessary to position a plurality of bonding wires with respect to the vibrator. In this case, it is easier to position and align the bonding wires on the frame than to position the bonding wires directly on the mounting face of the substrate.

The bonding wire may be joined with the vibrator by means of a process not particularly limited including ultrasonic bonding, spot welding, a conductive adhesive or soldering.

The bonding wire is electrically connected with the terminal of the vibrator. In a preferred embodiment, the bonding wire is joined with the terminal of the vibrator. The bonding wire is, however, not necessarily directly joined with the terminal. For example, the tip end of the bonding wire may be joined with the vibrator at a region other than the terminal. In this case, the tip end of the bonding wire and the terminal may be electrically connected through a wiring on the vibrator or an electric cable separate from the vibrator.

It is necessary to support the vibrator so that the vibrator does not directly contact with the substrate for preventing the adverse effects on the vibration. In a preferred embodiment, the distance between the vibrator and substrate is not smaller than 0.1 mm and more preferably is not smaller than 0.2 mm.

The vibrator may be made distant from the mounting face of the substrate by means of a method not particularly limited. For example in FIGS. 1 to 4, the end part of each bonding wire is bent so that the joining ends 9c and 10c of the wires 9 and 10 are distant from the mounting face 11a. Alternatively, the thickness of the contact pad on the mounting face of the substrate may be made larger so that the vibrator is made distant from the mounting face.

Figure 5:
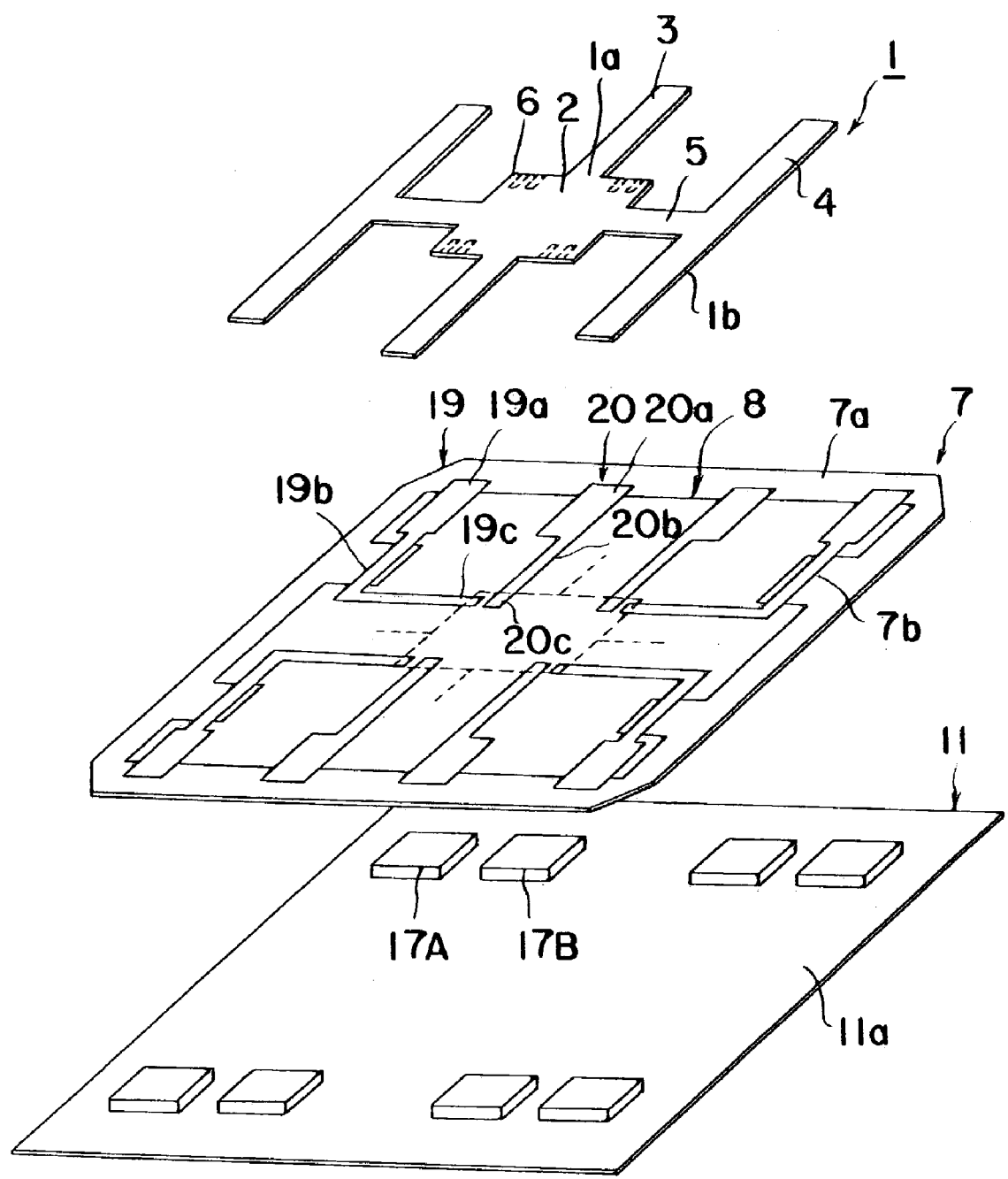
FIG. 5 is a broken perspective view showing a supporting structure according to another embodiment.

FIG. 5 is a broken perspective view showing a supporting system according to this embodiment. Many of the components shown in FIG. 5 are the same as those already shown in FIG. 1, and the explanation may be omitted. In FIG. 5, the bonding wires 19 and 20 are not bent and substantially planar shaped. If the bonding wires 19 and 20 are mounted on the contacts 12A and 12B (see FIG. 1) and the vibrator 1 is mounted on the end parts 19c and 20c of the wires, the distance between the vibrator 1 and mounting face 11a may be considerably reduced. The vibrator might be into contact with the substrate when a vibration is excited in the vibrator. The thickness of each of the contacts pads 17A and 17B on the mounting face 11a may be increased and the end parts 19a and 20a of the bonding wires are mounted on the contact pads 17A and 17B, respectively. It is thus possible to sufficiently increase the distance between the vibrator 1 and mounting face 11a. Wire portions 19b and 20b represent main parts of the wires.

The thickness of the contact pad on the mounting face 11a may preferably be not smaller than 0.1 mm and more preferably be not smaller than 0.2 mm, for preventing the adverse effects of the mounting face 11a on the vibration of the vibrator 1.

The bonding wire is made of a conductive material not particularly limited, and may preferably be flexible or deformable. On this viewpoint, the material may be copper with gold plating, nickel with gold plating, nickel or aluminum.

The width and thickness of the bonding wire are not particularly limited, and may preferably be not smaller than 25 μm and 10 μm, respectively, and more preferably be not smaller than 50 μm and 20 μm, respectively, for stably supporting the vibrator for a long period of time. The width and thickness of the bonding wire may preferably be not larger than 200 μm and 80 μm, respectively, and more preferably be not larger than 100 μm m and 40 μm, respectively, for miniaturize the whole supporting structure.

The upper face of the vibrator may be supported by means of the bonding wire. In this case, for example as shown in FIG. 9, the vibrator is suspended from the end parts of the bonding wires. Such a structure is preferred for reducing the thickness of the whole supporting structure.

Alternatively, for example as shown in FIG. 4, the lower face of the vibrator may be supported with the bonding wires. Such a structure is preferred for supporting the vibrator for a long period of time with stability.

The kind of the substrate is not particularly limited and may preferably be a substrate for a package.

In a preferred embodiment, the vibrator has a bending vibration piece and a fixing portion fixing the piece. The fixing portion is connected with the bonding wire. It is thus possible to minimize the effects of the supporting structure on the bonding vibration of the piece and to reduce the deviation of vibration among vibrators due to the effects of the supporting structure.

In a preferred embodiment, the vibrator is for a vibratory gyroscope for detecting a turning angular rate. In this case, the vibrator outputs an output signal which is then processed to calculate a turning angular rate. The error or deviation of the turning angular rate may thus be considerable due to the deviation of vibration among vibrators. The effects of the present invention may be thus considerable.

In a preferred embodiment, the frame is made of an insulating material. In this case, as shown in the examples of FIGS. 1 to 5, the bonding wires may be directly fixed to the frame. The material of the frame is not particularly limited and may preferably be a resin, insulating ceramics or glass. The material may preferably be polyimide, quartz glass or alumina ceramics. The bonding wire may be joined with the frame by means of a process such as adhesion, fitting, pressure joining or caulking.

Alternatively, the frame may be made of a conductive material. The material includes a metal, conductive plastic or a resin with metal plating. Particularly when the frame is made of a metal, the retention of the shape of the frame is further improved so that the precision of alignment of bonding wires may be further improved. Such metal includes stainless steel, copper, nickel, aluminum and brass.

When the frame is made of a conductive material, however, it is necessary to provide an insulator between the frame and bonding wires so that the frame and wires are insulated. Such insulator may preferably be polyimide, epoxy or silicone resins. The shape of the insulator is not particularly limited and includes a film or sheet.

Figure 6:
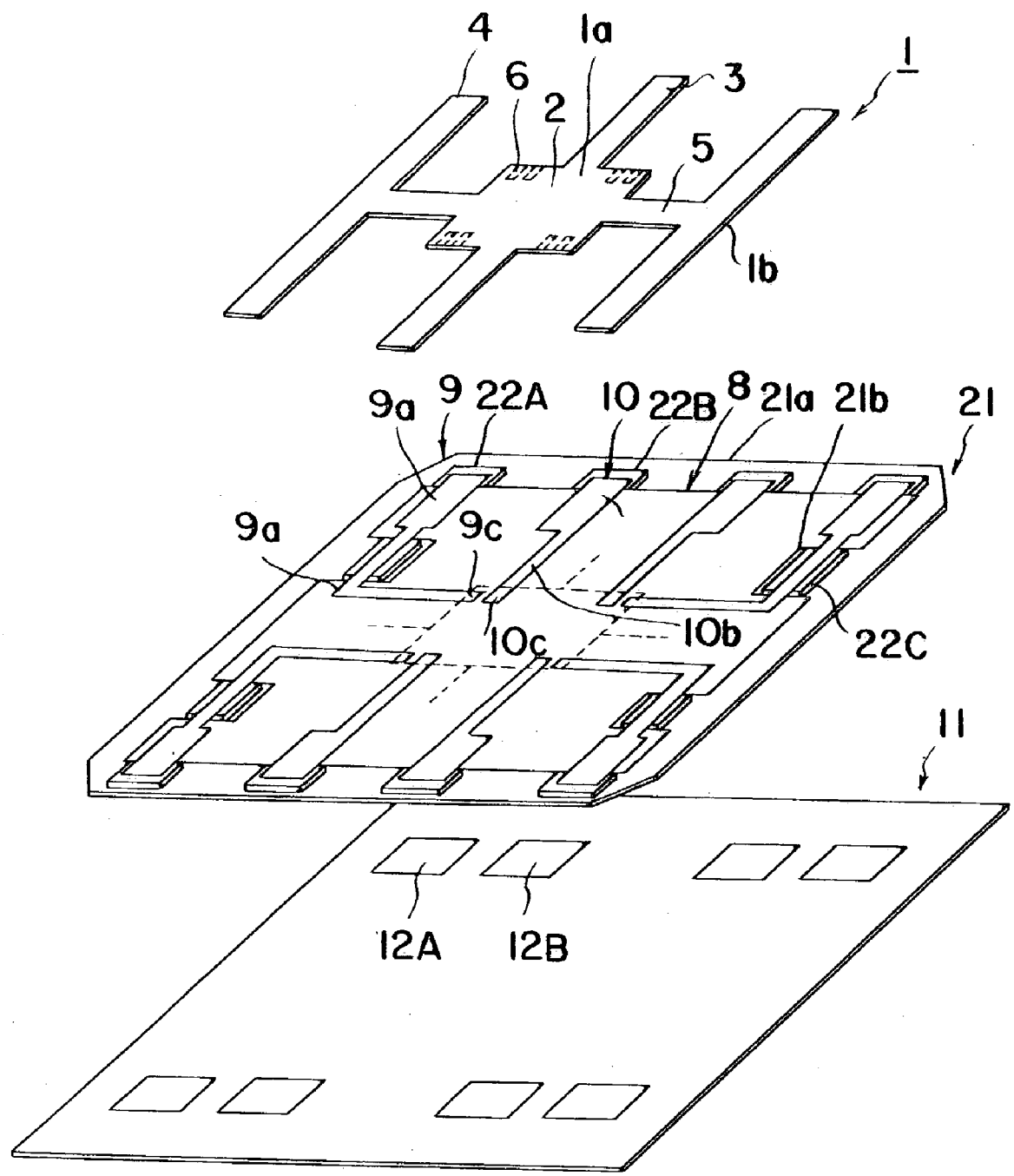
FIG. 6 is a broken perspective view showing a supporting structure according to still another embodiment of the present invention.
Figure 7:
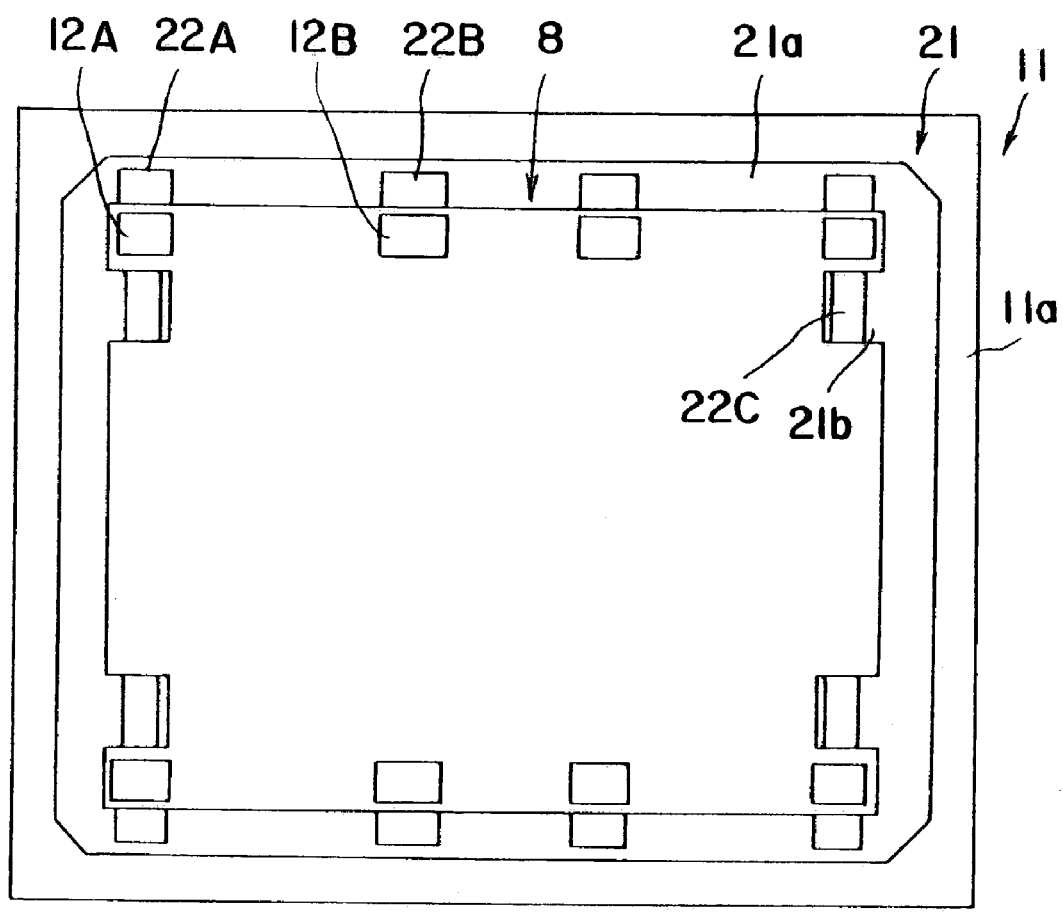
FIG. 7 is a plan view showing a substrate 11, frame 21 and insulators 22A, 22B and 22C used in the embodiment of FIG. 6.
Figure 8:
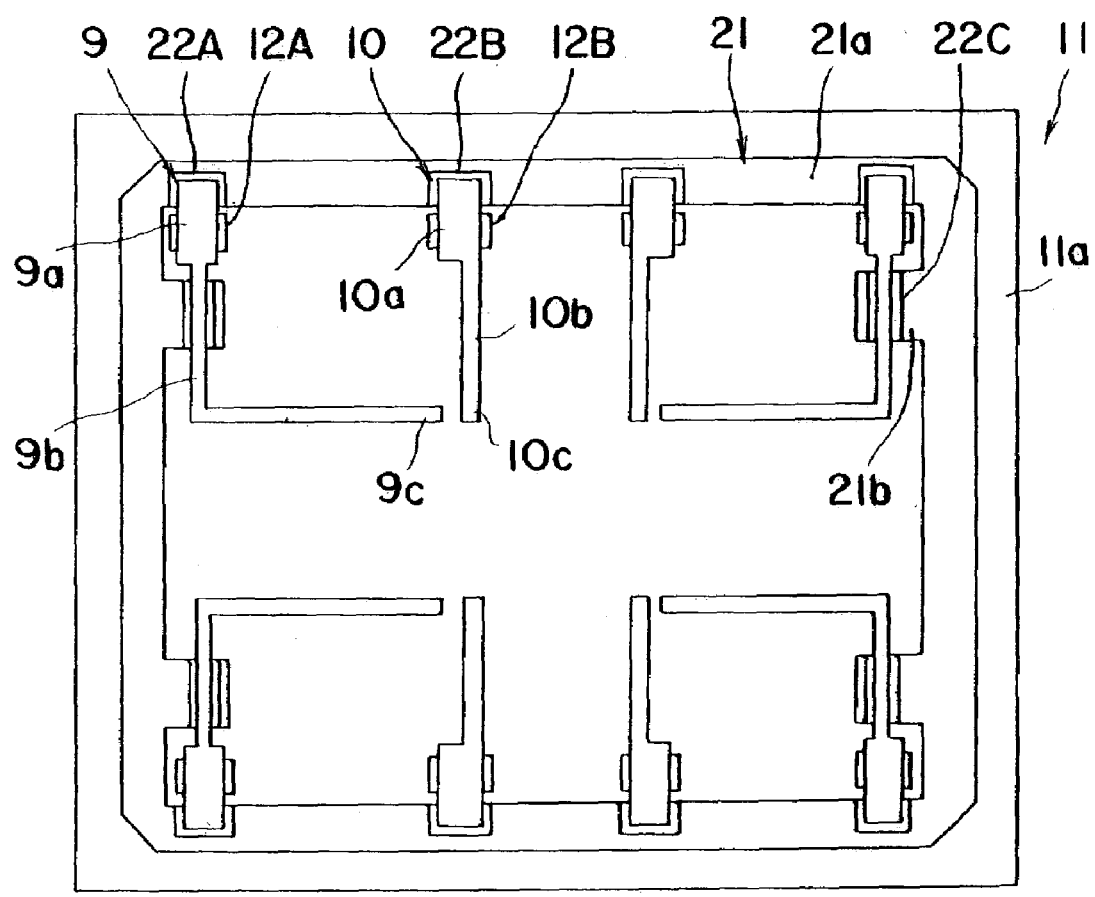
FIG. 8 is a plan view showing bonding wires 9 and 10 fixed onto the frame 21 of FIG. 7.

FIGS. 6 to 10 relate to embodiments with the frame made of a conductive material. FIG. 6 is a broken perspective view showing a supporting structure according to the present invention and FIG. 7 is a plan view showing a substrate 11, frame 21 and insulators 22A, 22B and 22C used in the present embodiment. FIG. 8 is a plan view showing bonding wires 9 and 10 fixed on the wire 21 of FIG. 7 and FIG. 9 is a plan view showing a supporting structure according to the present embodiment.

As shown in FIG. 7, a substrate 11 according to the present embodiment has a mounting face 11a on which contact pads 12A and 12B are provided. A frame 21 is provided on the mounting face 11a. The frame 21 according to the present embodiment is made of a conductive material. The frame 21 has an outer frame 21a and supplementary supporting parts 21b protruding inwardly from the outer frame 21a. A space 8 is formed and profiled in the frame 21. The mounting face 11a of the substrate 11 is exposed in the space 8. Insulators 22A, 22B and 22C are fixed on predetermined positions on the frame 21.

As shown in FIG. 8, the end parts 9a, 10a of the bonding wires 9, 10 are joined and fixed onto the outer frame 21a through the insulators 22A, 22B, respectively. The end parts 9a, 10a are electrically connected with the corresponding contact pads 12A, 12B, respectively. Elongate bodies 9b, 10b are protruded from the corresponding end parts 9a, 10a of the bonding wires 9, 10, respectively. The main body 9a is supported on the supplementary supporting part 21b through the insulator 22C.

As shown in FIG. 9, the end parts 9c and 10c of the bonding wires 9 and 10 are joined with terminals 6 on the vibrator so that the vibrator is mounted on the substrate. In the present example, the bonding wires are joined with the terminals 6 on the upper face 1a of the vibrator so that the vibrator is suspended with the bonding wires. The terminals of the vibrator 1 are electrically connected with the corresponding contact pads on the substrate 11 through the bonding wires 9, 10, respectively.

In the present example, the end parts of the bonding wires 9, 10 are bent so that the end parts 9c, 10c on the vibrator 1 is spaced apart from the mounting face 11a. It is thus possible to control a distance between the vibrator 1 and mounting face 11a to prevent direct contact of the vibrator 1 with the mounting face 11a.

Figure 10:
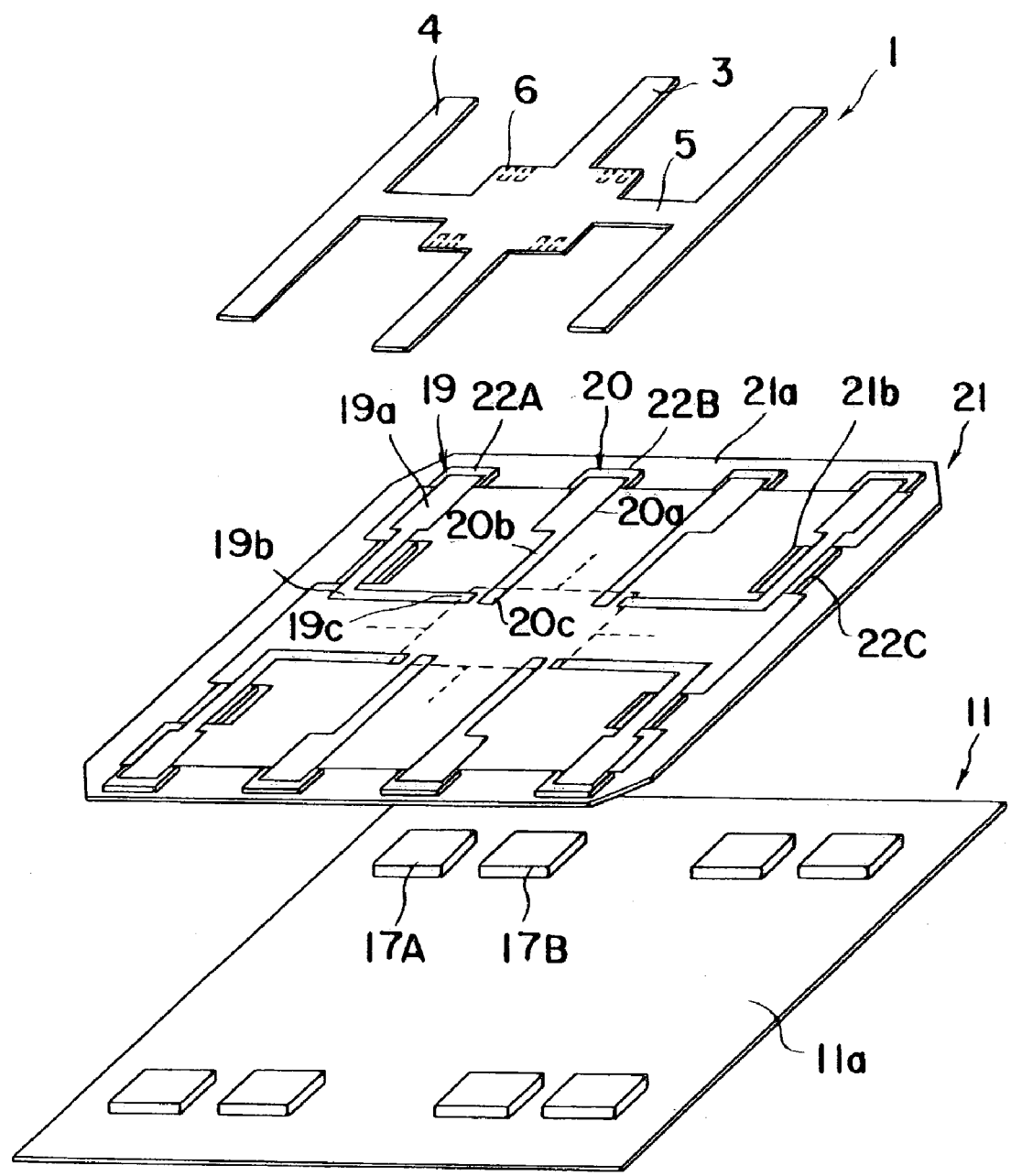
FIG. 10 is a broken perspective view showing a supporting structure according to still another embodiment of the present invention.

FIG. 10 is a broken perspective view showing a supporting structure according to still another embodiment of the present invention. In FIG. 10, the same components shown in FIG. 6 are indicated by the same numerals as those in FIG. 6 and the explanation may be omitted. In FIG. 10, bonding wires 19 and 20 are not bent and substantially flat plate-shaped. The thickness of each of the contact pads 17A and 17B on the mounting face 11a is increased and the end parts 19a and 20a of the bonding wires are mounted on the corresponding pads 17A and 17B and joined. It is thus possible to provide a sufficiently large distance between the vibrator 1 and mounting face 11a.

In a preferred embodiment, the conductive material of the frame is ground. It is proved that the noise due to the contribution of capacity coupling between the bonding wires may be thereby reduced.

Figure 11:
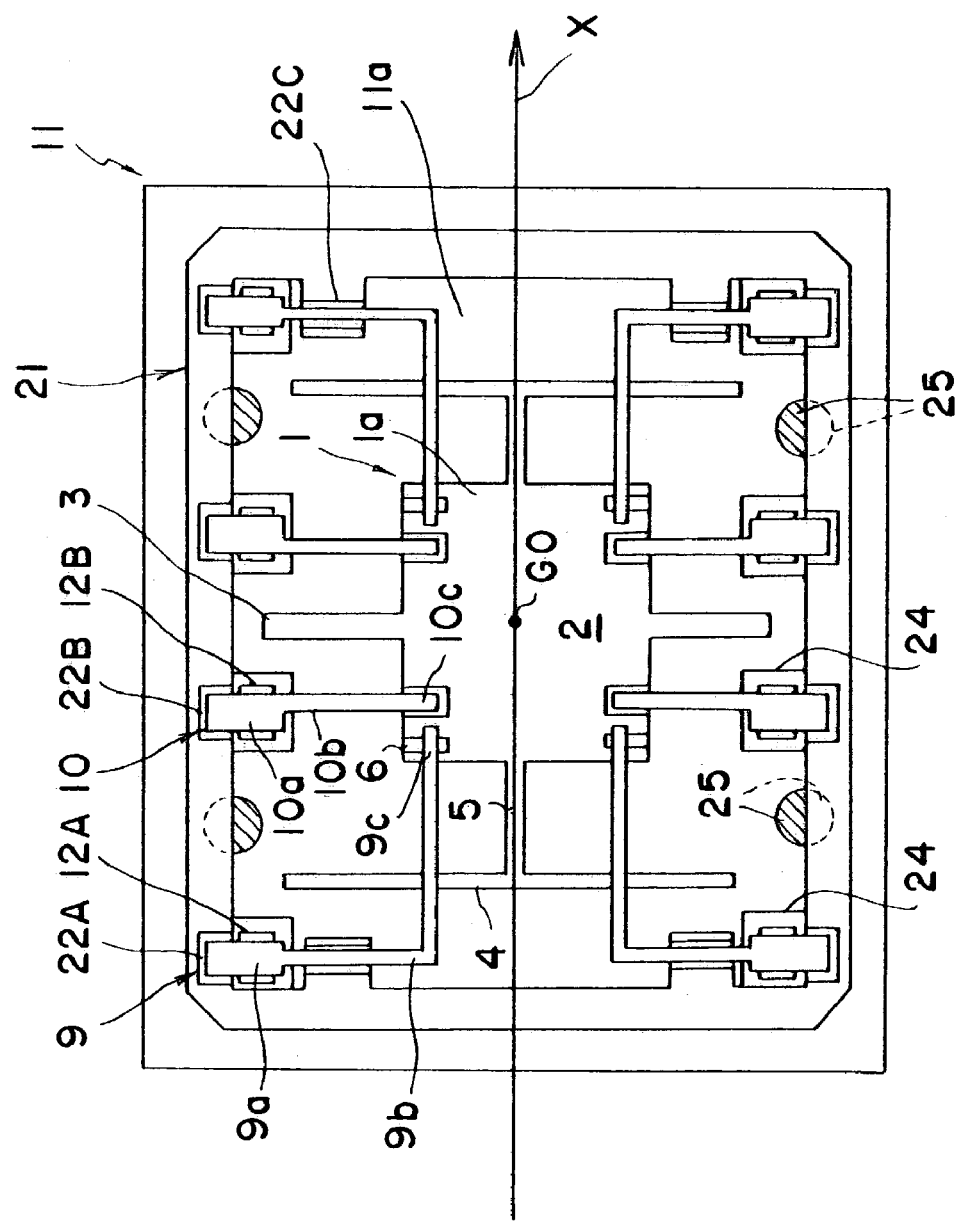
FIG. 11 is a plan view showing a supporting structure having a substrate 11 and a frame 21 ground onto the substrate 11.

FIG. 11 is a plan view showing a supporting structure according to this embodiment. The supporting system of the present embodiment is similar to that shown in FIG. 9. The components in FIG. 11 same as those shown in FIG. 9 are indicated by the same numerals and the explanation may be omitted. In the supporting system of FIG. 11, a frame 21 is fixed onto and electrically connected with the mounting face 11a of the substrate through conductive joining portions 25. The mounting face 11a of the substrate and frame 21 are ground, so that noise due to the contribution of electrostatic capacity coupling between adjacent bonding wires 9 and 10 may be reduced.

The conductive material may be ground by means of any method not particularly limited including firing of conductive paste, soldering, a conductive adhesive and spot welding. Further, the conductive joining portion 25 for joining the conductive material and mounting face may be made of a material such as a noble metal including gold and silver.

The conductive joining portion 24 may be ground at a plurality of ground points. In this case, a plurality of the conductive joining materials 25 may be provided on positions substantially symmetrical with respect to an X-axis on the center of gravity "GO" of the vibrator 1.

In the present embodiment, clearances 24 are formed surrounding the end parts 9a, 10a of bonding wires 9, 10 and insulators 22A, 22B, respectively. The ground electrode on the mounting face 11a is not provided in the clearances 24.

Figure 12:
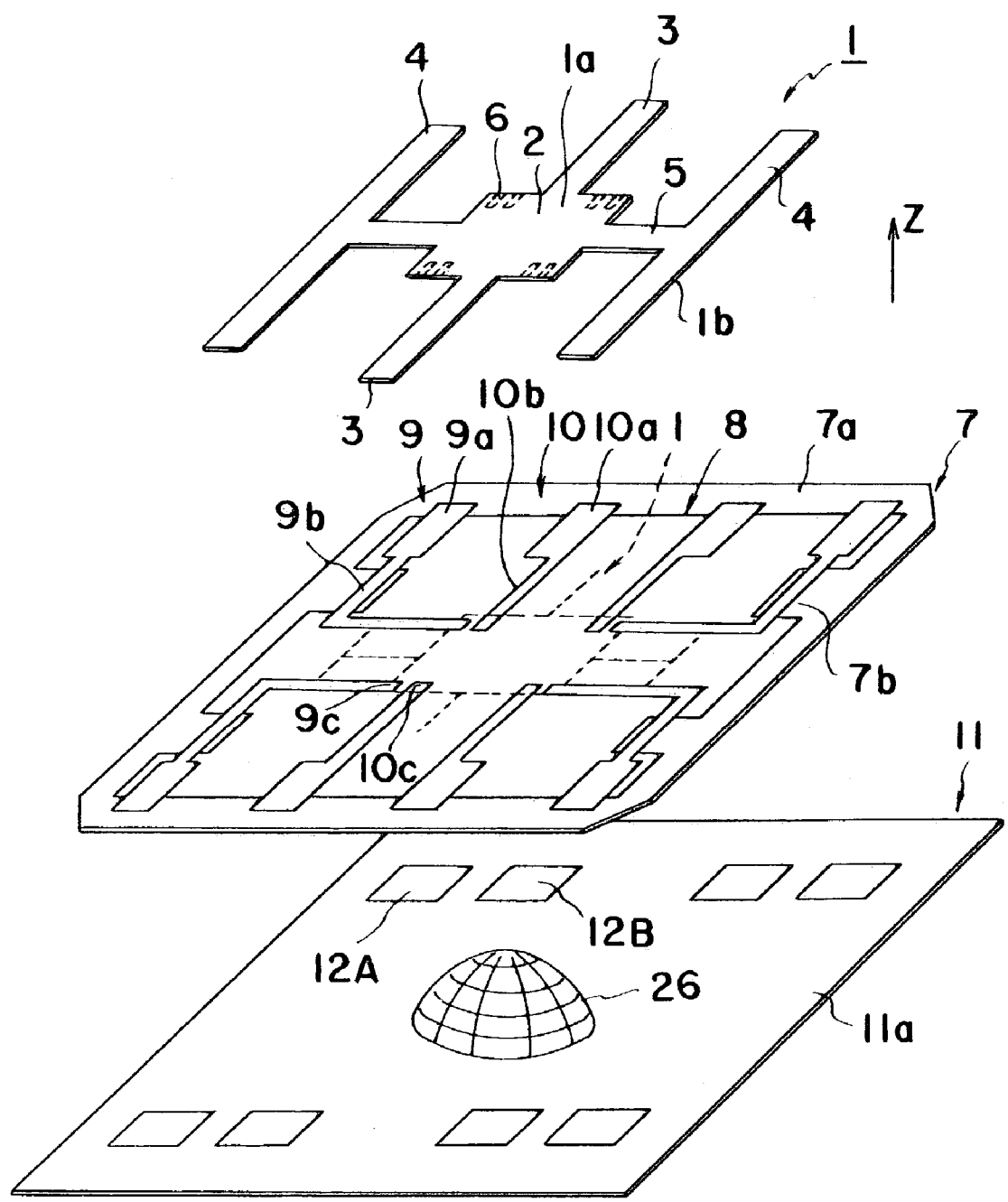
FIG. 12 is a broken perspective view showing a supporting system having the substrate 11 and a cushion layer 26 provided on the substrate.

In a preferred embodiment, a cushion layer is provided between the substrate and vibrator. FIG. 12 is a broken perspective view showing a supporting system according to this embodiment. Many components in FIG. 12 is the same as those shown in FIG. 1 and the explanation may be omitted.

In the present embodiment, the cushion layer 26 is provided on the mounting face 11a of the substrate 11 right under the vibrator 1. A clearance is provided so that the cushion layer 26 does not contact the vibrator 1.

The advantages will be described below. When shock is applied from the outside on the inventive supporting structure, the bonding wires 9 and 10 are deformed so that the vibrator may move toward the mounting face 11a. If the vibrator 1 directly contacts the mounting face 11a, the vibrator may be broken. Alternatively if the fracture of the vibrator is avoided, the deformation of the bonding wire may exceed the elastic deformation limit so that plastic deformation may occur. If plastic deformation is induced in the bonding wire, the shape of the supporting structure may be substantially changed. The vibrator may thereby detect unnecessary turning angular rate around an axis not to be detected to increase the noise and temperature drift.

On the contrary, according to the present embodiment, the vibrator moving toward the mounting face 11a may be supported with the cushion layer 26 to reduce the shock and to prevent excess deformation of the bonding wire.

The cushion layer 26 may preferably be made of a conductive material. When such conductive cushion layer 26 is mounted on the mounting face 11a, the electrical effects of the electrodes on the vibrator may be reduced. The cushion layer 26 may be made of a material such as a resin such as silicone and urethane resins, a rubber or metal spring.

Further, in a preferred embodiment, a ground guard electrode is provided on the above insulating material or insulator. Further, in a preferred embodiment, the following bonding wires are provided: a first bonding wire to be connected with a signal electrode for exciting a driving vibration in the vibrator, a second bonding wire to be connected with a ground electrode for exciting the driving vibration, a third bonding wire to be connected with a signal electrode for detecting a detection vibration induced in the vibrator, and a fourth bonding wire to be connected with a ground electrode for detecting the detection vibration.

Figure 13:
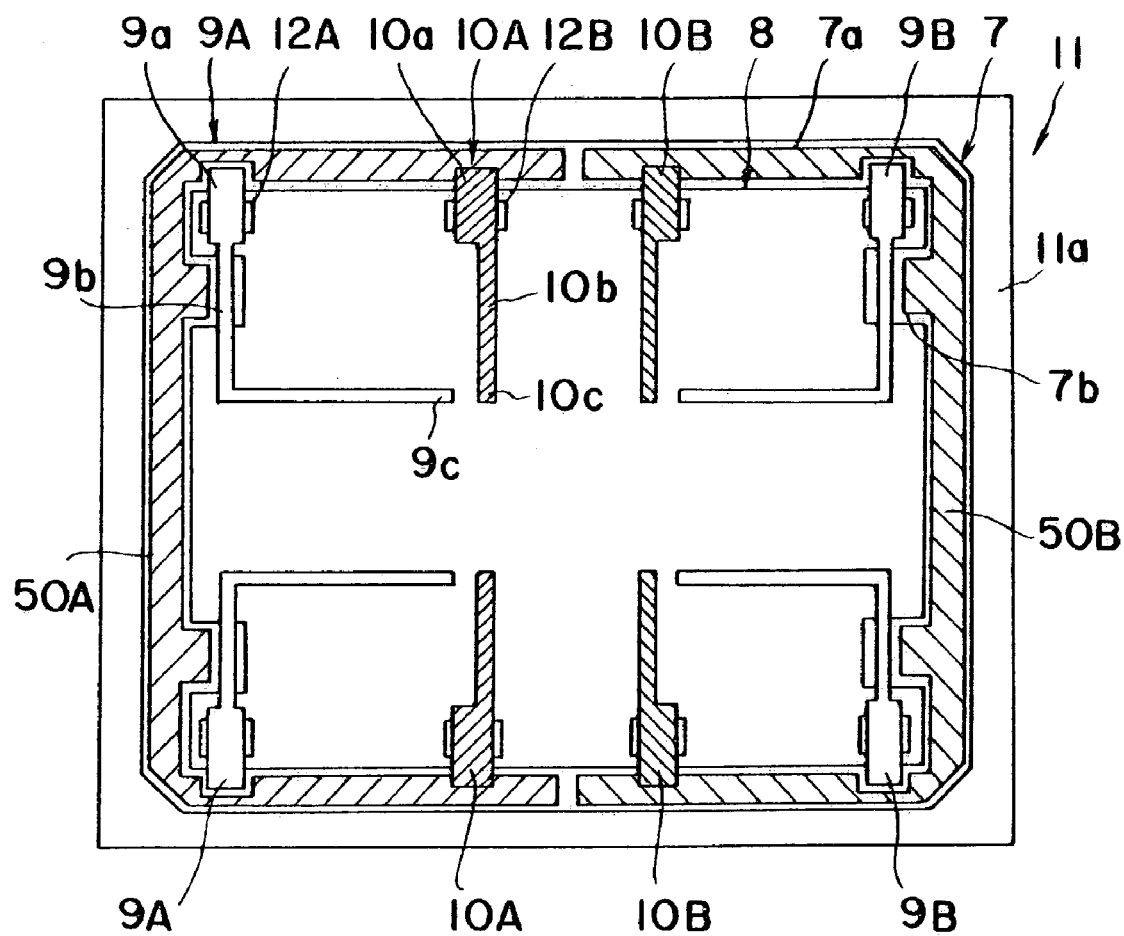
FIG. 13 is a plan view showing a supporting system having a frame 11 and guard electrodes 50A and 50B provided on the frame 11.
Figure 14:
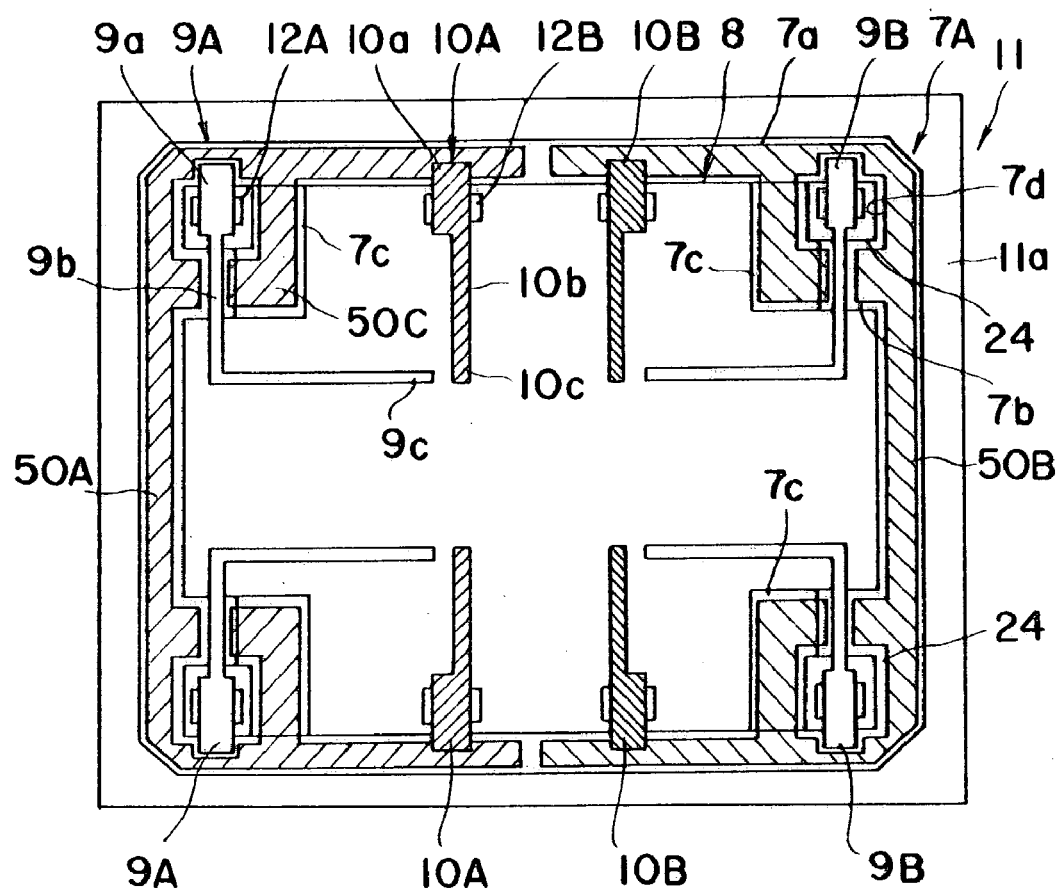
FIG. 14 is a plan view showing a supporting system having a frame 11 and guard electrodes 50A to 50C provided on the frame 11.

FIGS. 13 and 14 relate to this embodiment. The supporting system shown in FIGS. 13 and 14 is similar to that shown in FIG. 3. In the system in FIG. 13, ground guard electrodes 50A and 50B are provided on the surface of the frame 7 made of an insulating material. In the present embodiment, the first bonding wires 9A for a signal electrode for driving, the second bonding wires 10A for a ground electrode for driving, the third bonding wires 9B for a signal electrode for detection and the fourth bonding wires 10B for a ground electrode for detection are provided. The second bonding wires 10A for a ground electrode for driving and fourth bonding wires 10B for a ground electrode for detection are connected with the guard electrodes 50A and 50B, respectively, and thus ground.

In FIG. 14, the first bonding wires 9A for a signal electrode for driving, the second bonding wires 10A for a ground electrode for driving, the third bonding wires 9B for a signal electrode for detection and the fourth bonding wires 10B for a ground electrode for detection are provided. Each surrounding part 7c is provided in a frame 7A surrounding each end part 9a of each of the bonding wires 9A, 9B for a signal electrode. Guard electrodes 50A and 50B are formed on the surface of the frame 7A made of an insulating material and ground. Guard electrodes 50C are formed in the surrounding parts 7c, respectively. The bonding wires 10A for a ground electrode for driving and 10B for a ground electrode for detection are connected with the guard electrodes 50A, 50B, respectively, and thus ground. The end parts 9a of the bonding wires 9A, 9B are surrounded with the guard electrodes 50A, 50B and 50C, respectively.

In a preferred embodiment, a plurality of the third bonding wires for signal electrode for detection are provided. The first bonding wire has a first connecting part, and the second bonding wire has a second connecting part. The third bonding wires are provided in positions substantially symmetrical with respect to a straight line connecting the first and second connecting parts. In a preferred embodiment, a plurality of the fourth bonding wires for ground electrode for detection are provided. The first bonding wire has a first connecting part, and the second bonding wire has a second connecting part. The fourth bonding wires are provided in positions substantially symmetrical with respect to a straight line connecting the first and second connecting parts.

Figure 15:
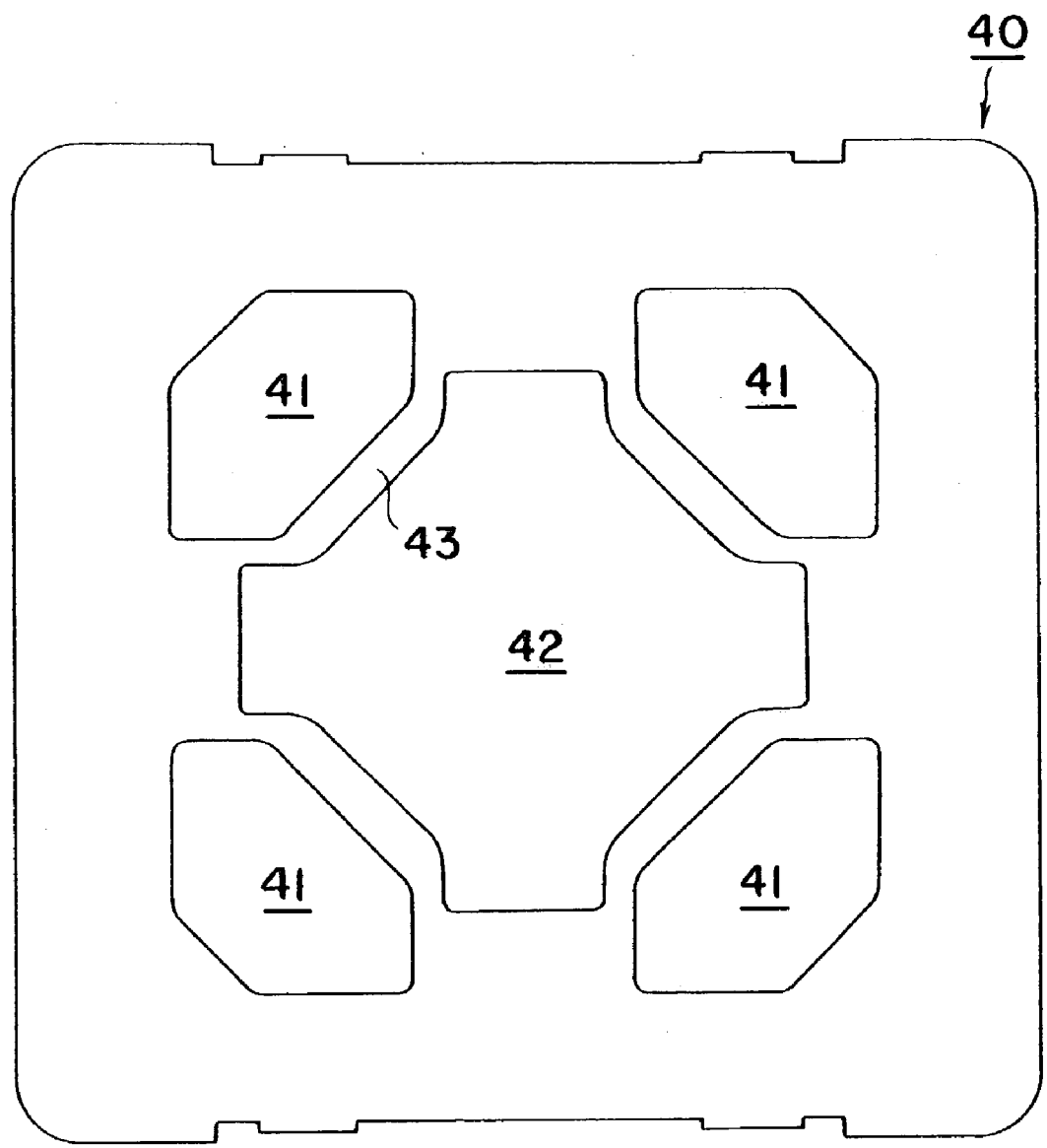
FIG. 15 shows a frame 40 composed of an insulating material.

FIGS. 15 to 19 relate to this embodiment. FIG. 15 shows a frame 40 composed of an insulating material. The frame 40 has a center hole 42 for positioning a vibrator and four through holes 41 surrounding the central hole 41. 43 represents a bridge part. The frame 40 according to the present example is made of a conductive material.

Figure 16:
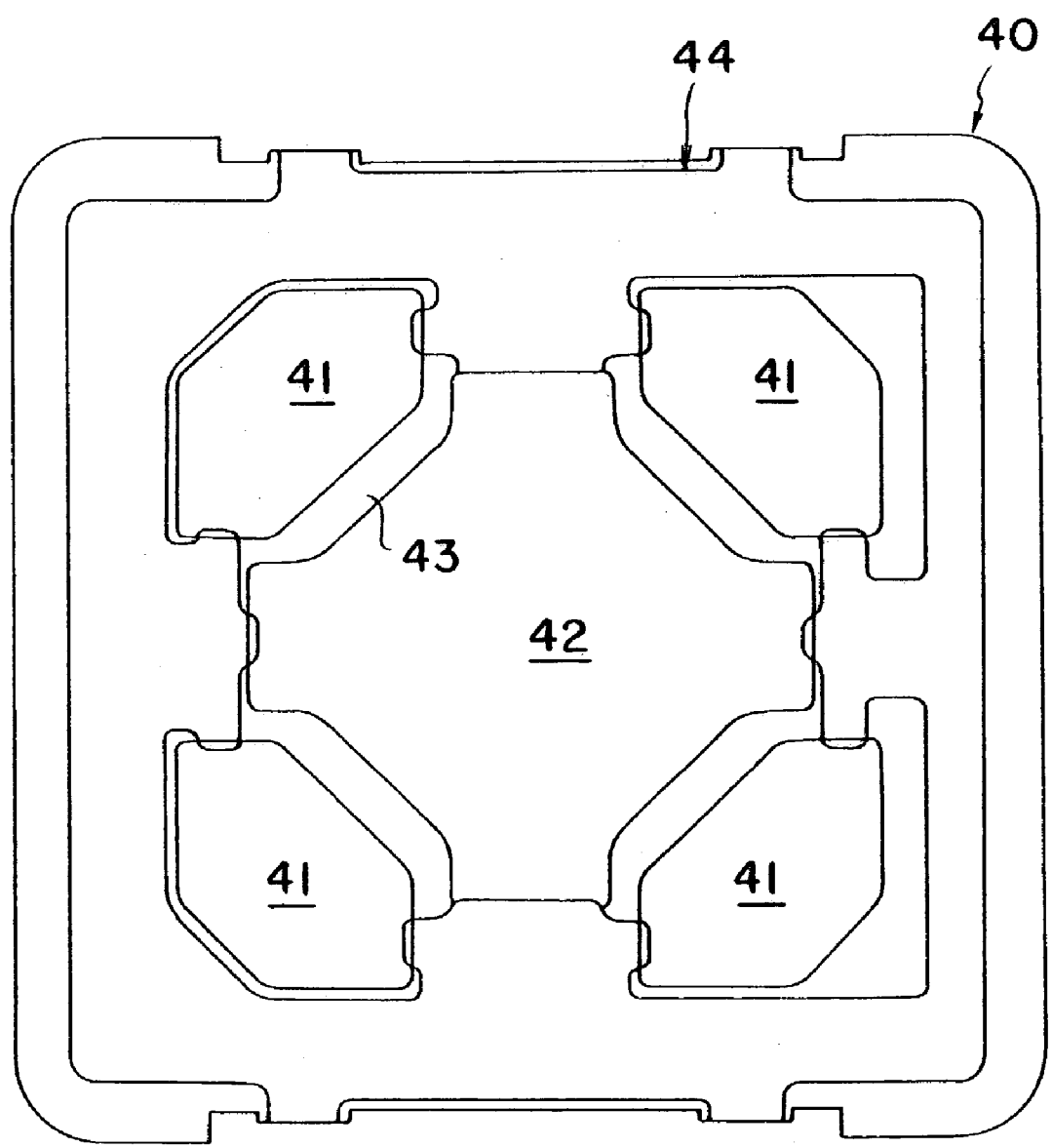
FIG. 16 shows the frame 40 and an insulator 44 mounted on the frame 40.
Figure 17:
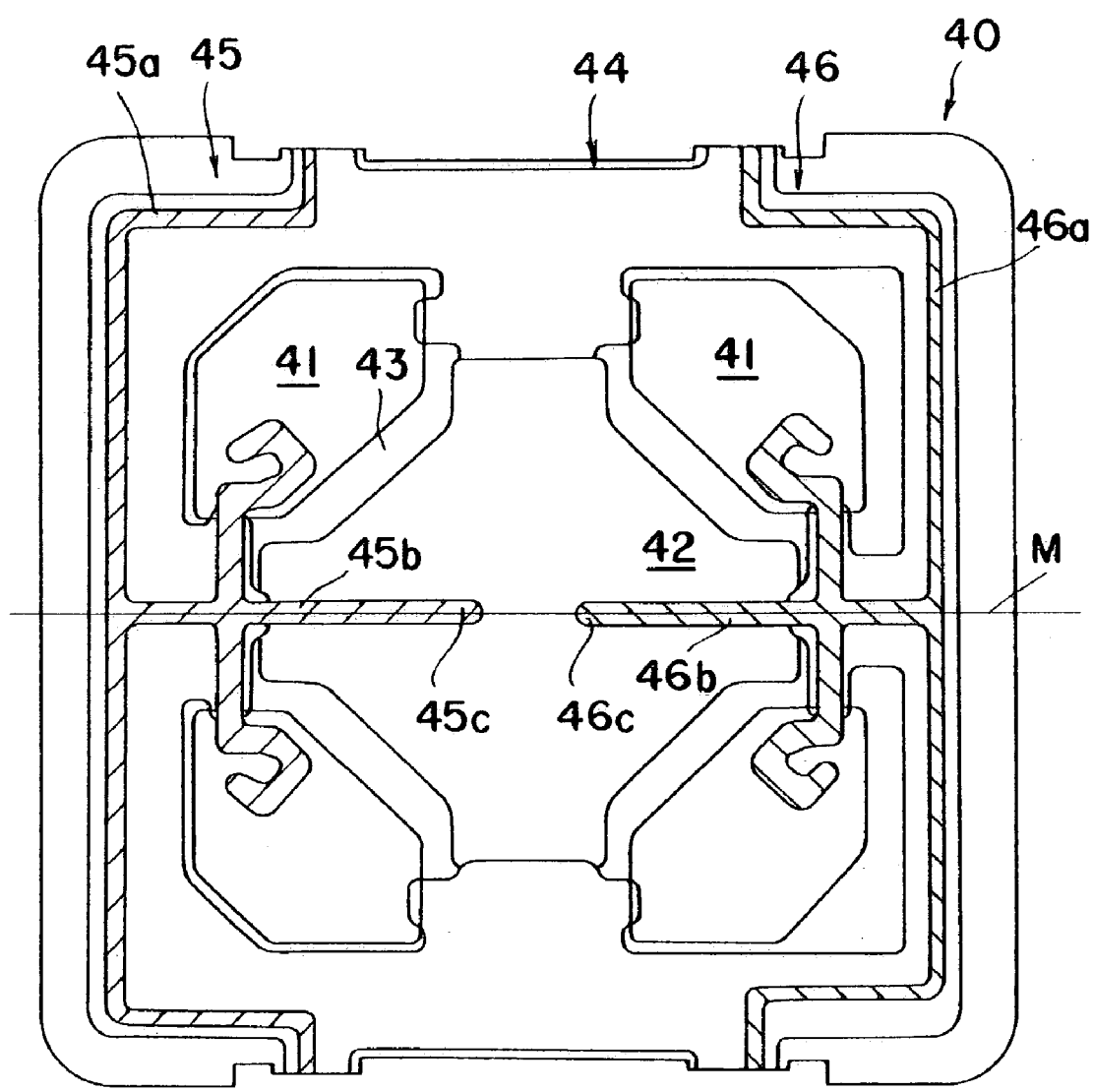
FIG. 17 further shows bonding wires 45 for signal electrode for detection and wires 46 for ground electrodes for driving.
Figure 18:
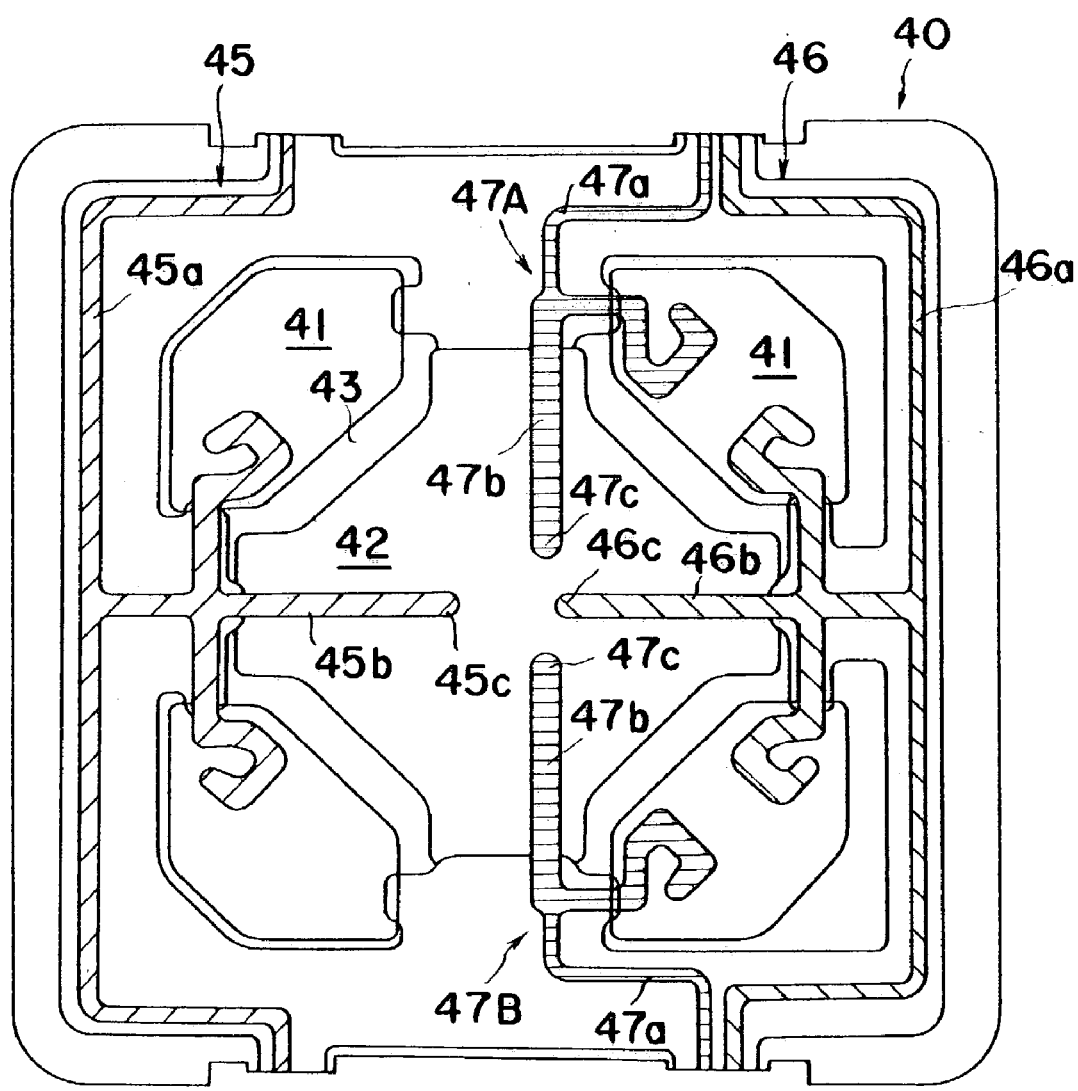
FIG. 18 is a plan view showing the frame 40, insulator 44, bonding wires 45 for a signal electrode for driving, bonding wires 46 for ground electrode for driving and bonding wires 47A and 47B for signal electrode for detection.
Figure 19:
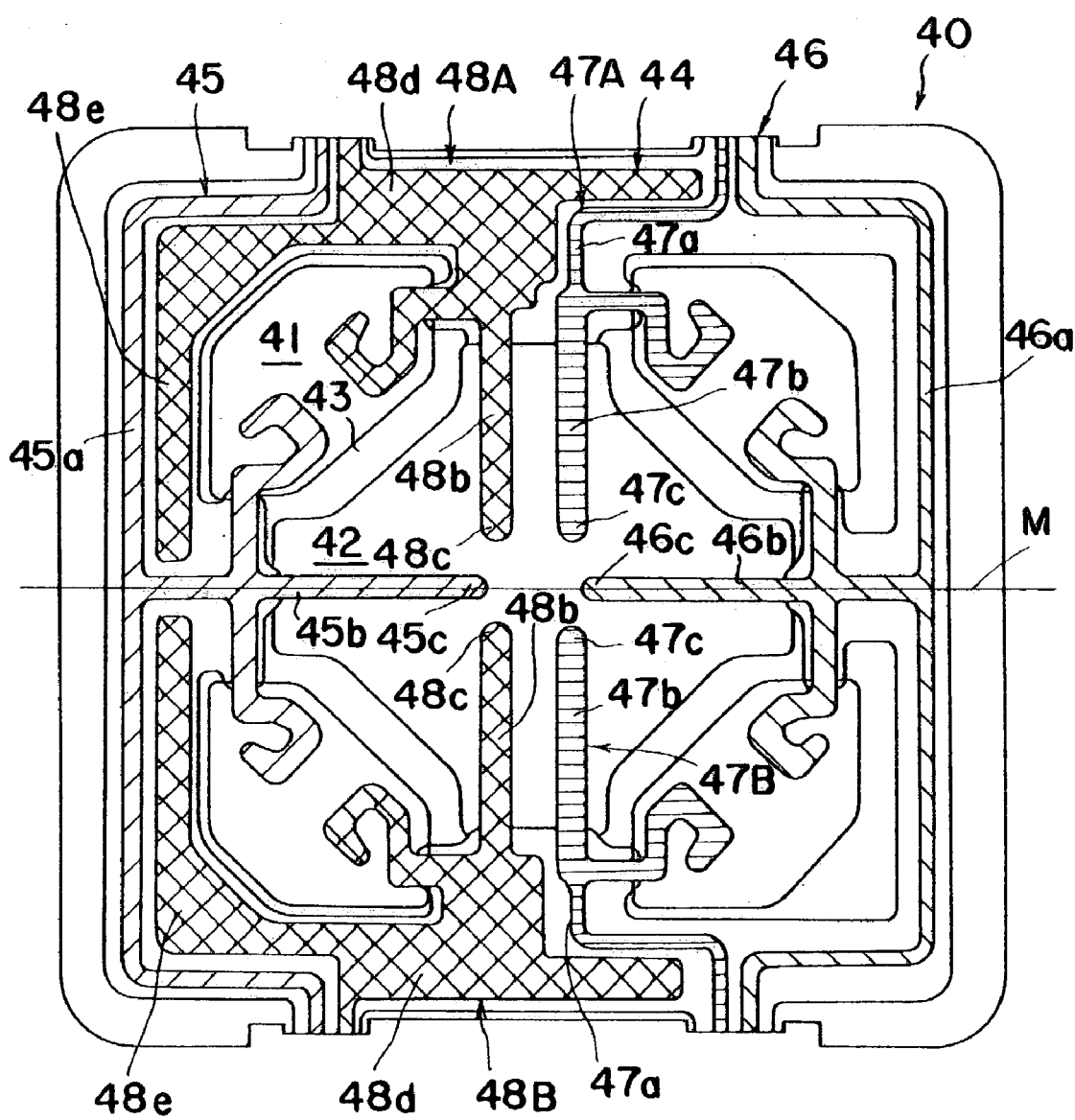
FIG. 19 is a plan view showing a supporting system.

FIG. 16 shows the frame 40 and an insulator 44 mounted on the frame 40. FIG. 17 further shows bonding wires 45 for signal electrode for detection and 46 for ground electrodes for driving mounted on the insulator. FIG. 18 still further shows bonding wires 47A and 47B for signal electrodes for detection mounted on the insulator. FIG. 19 still further shows bonding wires 48A and 48B for ground electrode for detection mounted on the insulator.

For example as shown in FIG. 17, the bonding wire 45 for a signal electrode for driving has a wiring 45a, a protrusion 45b into the central hole 42 and connecting part 46c for an electrode pad on a vibrator. The bonding wire 45 is connected with a signal electrode for exciting a driving vibration in the vibrator. The bonding wire 46 for a ground electrode for driving has a wiring 46a, a protrusion 46b into the central hole 42 and connecting part 46c for an electrode pad on a vibrator. The bonding wire 46 is connected with a ground electrode for exciting a driving vibration in the vibrator. In the present example, the connecting part 45c of the wire 45 and connecting part 46c of the wire 46 are opposed to each other. "M" is a straight line connecting the connecting parts 45c and 46c.

As shown in FIG. 18, each of the bonding wires 47A and 47B for signal electrode for detection has a wiring 47a, a protrusion 47b into the central hole 42 and connecting part 47c for an electrode pad on a vibrator. As shown in FIG. 19, each of the bonding wires 48A and 48B for a ground electrode for detection has a wiring 48a, a protrusion 48b into the central hole 42, a connecting part 48c and a guard electrode portion 48d. The wires 48A and 48B are ground onto the mounting face of the substrate.

In the present example, the straight line "M" connects the connecting part 45c of the wire for a signal electrode for driving and connecting part 46c of the wire for a ground electrode for driving. The third bonding wires 47A and 47B for a signal electrode for detection are provided in positions substantially symmetrical with respect to the straight line "M". Further, a plurality of the fourth bonding wires 48A and 48B for a ground electrode for detection are provided in positions substantially symmetrical with respect to the straight line "M".

The advantages will be described below. The inventors have tried to install a vibratory gyroscope in a small electronic device such as a mobile phone. It is thus necessary to considerably reduce the dimensions of a vibrator to, for example, several millimeters. In a vibrator having such small dimensions, electrostatic coupling may be induced to generate a noise. Such electrostatic coupling has not been considered problematic in a prior vibrator. In a vibrator having a reduced dimension, the distance between adjacent pads on the vibrator may be as small as, for example, about 50 micrometer. In a vibrator and pads having such small dimensions, the contribution of electrostatic coupling between the signal pad for driving and that for detection may be considerable. As a result, when a difference between measured values from two detecting systems in a vibrator standing still, the difference may not be zero due to the contribution of electrostatic coupling to generate a noise. Further, when an ambient temperature is changed, the electrostatic coupling may generate a zero-point temperature drift.

On the contrary, the third bonding wires 47A and 47B for a signal electrode for detection are provided in positions substantially symmetrical with respect to the straight line "M". It is thus possible to cancel the noises having the same phase and amplitude and thus to effectively reduce the noise due to the contribution of the electrostatic coupling. Further, it is also effective to provide a plurality of the fourth bonding wires 48A and 48B for a ground electrode for detection in positions substantially symmetrical with respect to the straight line "M".

In a preferred embodiment, the shapes of the wires 47A and 47B for signal electrode for detection are substantially symmetrical with each other with respect to the straight line "M". That is, the shapes of the wires 47A and 47b are the substantially same. It is not, however, required that the shapes of the wires are the same.

EXAMPLES

Example 1

A supporting structure for a vibratory gyroscope shown in FIG. 1 was produced. A chromium film of 100 angstroms in thickness and a gold film of 1500 angstroms in thickness were formed on a wafer made of a Z-plate of quartz with a thickness of 0.1 mm, by sputtering. Both main faces of the wafer were coated with resist films.

The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching. The wafer was etched by immersing the wafer in ammonium bifluoride at a temperature of 80° C. for 20 hours to form the external shape of the vibrator. A gold film having a thickness of 2000 angstrom is formed as a film for electrode on the chromium film having a thickness of 100 angstrom using a metal mask. The vibrator 1 has a length of 3.8 mm, width of 4.5 mm, thickness of 0.1 mm and weight of about 0.8 mg.

The vibrator 1 was mounted in a package according to the process described referring to FIGS. 2 to 4. The substrate 11 was formed of alumina ceramics, the contact pads 12A and 12B were formed of gold, and the frame 7 was formed of polyimide resin. The position of each bonding wire may be adjusted with that of each of the contact pads 12A and 12B in a package. The bonding wires were produced by plating a copper film wire with gold. The thickness of the copper film wire was about 20 µm, the width was about 100 µm and the thickness of the gold plating was about 1 µm. The bonding wires were joined with the frame with an adhesive and with the vibrator 1 by means of ultrasonic bonding.

Example 2

The supporting structure shown in FIGS. 15 to 19 was produced according to the same process as the example 1. The substrate 11 was formed of alumina ceramics, the contact pads were formed of gold, the frame 40 was formed of SUS and the insulator 44 was formed of polyimide resin. Each bonding wire was produced by plating a copper film wire with gold. The thickness of the copper film wire was about 20 µm, the width was about 100 µm, and the thickness of the gold plating was about 1 µm. Each bonding wire was adhered with the insulator 44 and joined with the vibrator 1 by means of ultrasonic bonding.

As described above, the present invention provides a novel system for supporting a vibrator having a terminal for electrical connection. According to the system, the vibrator may be miniaturized and the deviation of the vibration property among vibrators in the supporting systems may be prevented.

The present invention has been explained referring to the preferred embodiments, however, the present invention is not limited to the illustrated embodiments which are given by way of examples only, and may be carried out in various modes without departing from the scope of the invention.

The invention claimed is:

1. A system for electrical connection, said system comprising:
   a substrate having a mounting face;
   a frame mounted on said mounting face, said frame having an inner hollow exposing at least a portion of said mounting face;
   a plurality of bonding wires supported on said substrate and attached to said frame; and
   a vibrator having a plurality of terminals and being substantially supported by only said bonding wires such that said vibrator does not contact said substrate, at least a portion of said vibrator is supported over said inner hollow, and said bonding wires are electrically connected with said terminals, wherein said vibrator generates electrical signals when subjected to movement.

2. The system of claim 1, wherein said substrate has a contact electrically connected with at least one of said bonding wires.

3. The system of claim 1, wherein said frame comprises an insulating material.

4. The system of claim 3, further comprising a guard electrode that is ground and is provided on said insulating material.

5. The system of claim 1, further comprising an insulator, wherein said frame comprises a conductive material and said insulator insulates said frame and said bonding wires.

6. The system of claim 5, wherein said conductive material is ground.

7. The system of claim 5, further comprising a guard electrode that is ground and is provided on said insulator.

8. The system of claim 1, wherein said vibrator has an upper face and lower face opposing said substrate and said bonding wire supports said lower face.

9. The system of claim 1, wherein said substrate is a substrate for a package.

10. The system of claim 1, further comprising a cushion layer between said substrate and said vibrator.

11. The system of claim 1, wherein said vibrator further comprises a bending vibration piece and a fixing part for fixing said bending vibration piece, and at least one of said bonding wires is to be bonded with said fixing part.

12. The system of claim 1, wherein said vibrator is a vibrator for a vibratory gyroscope for detecting a turning angular rate.

13. The system of claim 1, wherein said bonding wires include a first bonding wire to be connected with a signal electrode for driving, a second bonding wire to be connected with a ground electrode for driving, a third bonding wire to be connected with a signal electrode for detection, and a fourth bonding wire to be connected with a ground electrode for detection.

14. The system of claim 13, further comprising a plurality of said third bonding wires, wherein said first bonding wire has a first connecting part, said second bonding wire has a second connecting part, and said third bonding wires are provided in positions substantially symmetrical with respect to a straight line connecting said first and second connecting parts.

15. The system of claim 13, further comprising a plurality of said fourth bonding wires, wherein said first bonding wire has a first connecting part, said second bonding wire has a second connecting part, and said fourth bonding wires are provided in positions substantially symmetrical with respect to a straight line connecting said first and second connecting parts.

16. A supporting structure comprising said system of claim 1 and said vibrator supported with said system.

* * * * *